United States Patent
Chun et al.

(10) Patent No.: US 8,526,793 B2
(45) Date of Patent: Sep. 3, 2013

(54) INFORMATION STORAGE MEDIUM INCLUDING META DATA FOR MULTI-ANGLE TITLE, AND APPARATUS AND METHOD FOR REPRODUCING THE SAME

(75) Inventors: Hye-Jeong Chun, Yongin-si (KR); Sung-Wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1050 days.

(21) Appl. No.: 12/500,838

(22) Filed: Jul. 10, 2009

(65) Prior Publication Data

US 2009/0274439 A1    Nov. 5, 2009

Related U.S. Application Data

(63) Continuation of application No. 11/297,507, filed on Dec. 9, 2005.

(30) Foreign Application Priority Data

Dec. 11, 2004  (KR) ............................... 2004-104618
Dec. 7, 2005   (KR) ............................... 2005-119084

(51) Int. Cl.
*H04N 9/80*   (2006.01)
*G11B 27/10*  (2006.01)

(52) U.S. Cl.
CPC .................. *G11B 27/105* (2013.01)
USPC ........... 386/248; 386/239; 386/241; 386/281; 369/30.08

(58) Field of Classification Search
CPC ............................... H04N 5/85; G11B 27/105
USPC ............... 386/239, 241, 248, 281, 240, 344; 707/1; 369/53.3, 275.1, 275.3, 30.08
See application file for complete search history.

(56) References Cited

U.S. PATENT DOCUMENTS 5,956,457 A   9/1999   Hirayama et al.
5,999,696 A   12/1999  Tsuga et al.

(Continued)

FOREIGN PATENT DOCUMENTS

CN   101057276      10/2007
EP   0 737 975 A2   10/1996

(Continued)

OTHER PUBLICATIONS

Office Action issued on Jun. 26, 2009, in corresponding Russian Patent Application No. 2007121736.

(Continued)

*Primary Examiner* — Thai Tran
*Assistant Examiner* — Mishawn Dunn
(74) *Attorney, Agent, or Firm* — NSIP Law

(57) ABSTRACT

A storage medium including meta data for providing an enhanced search function on AV data supporting multi-angle, and a reproducing apparatus and method for reproducing AV data from the storage medium are provided. The storage medium comprises moving picture data for supporting multi-angle; and meta data for providing an enhanced search function on the moving picture data, wherein the meta data is defined according to scene, and comprises information regarding at least one search keyword to be applied to a corresponding scene and information regarding an angle supported by the corresponding scene. Such meta data further includes information regarding a start location and a reproduction duration time of the corresponding scene. As a result, an enhanced search function can be realized according to scene, character, actor, or search criterion which a producer arbitrary defines, with respect to moving picture data supporting multi-angle.

3 Claims, 11 Drawing Sheets

(56) References Cited

U.S. PATENT DOCUMENTS

| | | | |
|---|---|---|---|
| 6,049,654 | A | 4/2000 | Furuta et al. |
| 6,181,872 | B1 * | 1/2001 | Yamane et al. ............... 386/332 |
| 6,289,165 | B1 | 9/2001 | Abecassis |
| 6,360,055 | B1 * | 3/2002 | Kaneshige et al. ........... 386/248 |
| 2001/0019657 | A1 | 9/2001 | McGrath et al. |
| 2002/0044757 | A1 | 4/2002 | Kawamura et al. |
| 2002/0069218 | A1 | 6/2002 | Sull et al. |
| 2002/0198864 | A1 | 12/2002 | Ostermann et al. |
| 2003/0113096 | A1 * | 6/2003 | Taira et al. ...................... 386/46 |
| 2004/0067042 | A1 | 4/2004 | Hughes, Jr. |
| 2004/0101290 | A1 * | 5/2004 | Seo et al. ...................... 386/125 |
| 2004/0170391 | A1 | 9/2004 | Tsumagari et al. |
| 2004/0184768 | A1 | 9/2004 | Seo et al. |
| 2004/0223743 | A1 | 11/2004 | Seo et al. |
| 2005/0086266 | A1 | 4/2005 | Kang et al. |
| 2005/0117884 | A1 | 6/2005 | Kang et al. |
| 2005/0125428 | A1 | 6/2005 | Kang et al. |
| 2005/0244137 | A1 | 11/2005 | Takashima et al. |
| 2006/0126487 | A1 * | 6/2006 | Seo et al. ................... 369/275.3 |

FOREIGN PATENT DOCUMENTS

| | | |
|---|---|---|
| EP | 0 847 196 A1 | 6/1998 |
| JP | 05-001570 A | 1/1993 |
| JP | 2000-013755 | 1/2000 |
| JP | 2000-013755 A | 1/2000 |
| JP | 2003-289487 A | 10/2003 |
| JP | 2004-128710 | 4/2004 |
| JP | 2004-145997 | 5/2004 |
| JP | 2005-117659 A | 4/2005 |
| KR | 2003-37140 | 5/2003 |
| KR | 10-2003-0097140 A | 12/2003 |
| KR | 2006-65476 | 6/2006 |
| RU | 2 228 546 C2 | 5/2004 |
| WO | WO-95/12197 | 5/1995 |
| WO | WO 2004/001748 | 12/2003 |
| WO | WO 2004/068843 | 8/2004 |
| WO | WO 2004/095834 A1 | 11/2004 |
| WO | WO 2005/065166 A2 | 7/2005 |

OTHER PUBLICATIONS

Office Action issued by Korean Intellectual Property Office in Korean Patent Application No. 2005-119084 on Jan. 24, 2006.

Search Report issued by International Searching Authority in International Patent Application No. PCT/KR2005/004211 on Jan. 31, 2006.

Office Action issued in Taiwanese Patent Application No. 094143830 on Aug. 30, 2007.

English Translation of Russian Office Action issued Mar. 3, 2009.

Office action issued by State Intellectual Property Office of China in Chinese Patent Application No. 200500419777 on Apr. 24, 2009.

U.S. Appl. No. 11/297,507, filed Dec. 9, 2005, Hye-Jeong Chun et al., Samsung Electronics Co., Ltd.

Office Action issued by the Japanese Patent Office on Jul. 12, 2011, in counterpart Japanese Patent Application No. 2007-545385. (6 pages, in Japanese language and English translation thereof).

Japanese Office Action issued Oct. 18, 2011, in counterpart Japanese Patent Application No. 2009-166012 (7pp, including and English translation).

Korean Notice of Allowance mailed May 30, 2007, issued in counterpart Korean Patent Application No. 10-2005-0119084; 6 pages including English translation.

Russian Decision on Grant of a Patent for Invention, mailed Nov. 2, 2012, issued in counterpart Russian Patent Application No. 2008150930; 14 pages including English translation.

Mexican Office Action issued Jan. 28, 2013 in counterpart Mexican Patent Application No. MX/a/2010/004117 (3 pages, in Spanish).

* cited by examiner

```
<xs:element name="scene" maxOccurs="unbounded">
  <xs:complexType>
    <xs:sequence>
      <xs:element name="scenetype" type="SceneTypeType" minOccurs="0"/>
      <xs:element name="character" type="CharacterType" minOccurs="0" maxOccurs="unbounded"/>
      <xs:element name="actor_actress" type="Actor_ActressType" minOccurs="0" maxOccurs="unbounded"/>
      <xs:element name="authordef" type="authordefType" minOccurs="0" maxOccurs="unbounded"/>
    </xs:sequence>
    <xs:attribute name="entry_point" use="required"/>
    <xs:attribute name="duration"/>
    <xs:attribute name="angle_number"/>
  </xs:complexType>
</xs:element>
```

INFORMATION STORAGE MEDIUM INCLUDING META DATA FOR MULTI-ANGLE TITLE, AND APPARATUS AND METHOD FOR REPRODUCING THE SAME

CROSS-REFERENCE TO RELATED APPLICATIONS

This application is a continuation of U.S. application Ser. No. 11/297,507 filed on Dec. 9, 2005, now pending, which claims all benefits accruing under 35 U.S.C. §119 from Korean Patent Application No. 10-2004-0104618, filed on Dec. 11, 2004, and Korean Patent Application No. 10-2005-0119084, filed on Dec. 7, 2005 in the Korean Intellectual Property Office, the disclosures of which are incorporated by reference herein.

BACKGROUND OF THE INVENTION

1. Field of the Invention

The present invention relates to reproduction of audio-visual (AV) data recorded on an information storage medium, and more particularly, to an information storage medium including meta data to provide an enhanced search function of searching for moving picture data supporting multi-angle using various search keywords, and an apparatus and method for reproducing AV data from the information storage medium.

2. Related Art

Information storage media, such as DVDs and Blu-ray discs, store moving picture data (multimedia image) including video, audio and/or subtitles compressed and encoded according to standards for digital video and audio compression, such as the MPEG (Motion Picture Experts Group) standard. Also, the storage media further store additional information, such as the encoding attribute of the moving picture data, the reproduction order of the moving picture data, etc. Conventionally, moving images recorded on a storage medium are sequentially reproduced according to such reproduction information or are reproduced while jumping in units of chapters when AV data is reproduced.

However, a method for jumping to an arbitrary scene according to a user's search criterion, such as scene, character, location, background music, property, etc., and reproducing moving picture data from the arbitrary scene still has not been proposed. Furthermore, since moving picture data is compressed, encoded, multiplexed and recorded on conventional storage media based on the MPEG2 standard, it is difficult to include meta data for providing a moving image search function on the storage media. Also, after the conventional storage media are manufactured, moving picture data or meta data contained therein cannot be edited and/or reused.

When a content producer attempts to classify moving picture data according to a scene and define meta data so as to allow a user to search for and reproduce the moving picture data according to the scene, in a moving image title supporting multi-angle, it is preferable to map each angle to corresponding meta data, if some part or the entire scene includes moving picture data composed of a plurality of angles. However, the conventional meta data structure does not provide and cannot be used to distinguish multi-angle.

SUMMARY OF THE INVENTION

Various aspects and example embodiments of the present invention provide a storage medium including meta data to provide an enhanced search function of searching for moving picture data recorded in a multi-angle title using various search keywords, and an apparatus and method for reproducing data from the storage medium. A meta data structure is provided with an enhanced search function of jumping to an arbitrary location of moving picture data and reproducing the moving picture data from the arbitrary location. The search can be conducted according to a user's search criterion, such as scene, character, shooting background, etc., in a moving picture data structure in which moving picture data supporting multi-angle can be selectively reproduced.

Additional aspects and/or advantages of the invention will be set forth in part in the description which follows and, in part, will be obvious from the description, or may be learned by practice of the invention.

According to an aspect of the present invention, an information storage medium is provided with moving picture data supporting multi-angle; and meta data for providing an enhanced search function on the moving picture data, wherein the meta data is defined scene by scene, and comprises information regarding at least one search keyword to be applied to a corresponding scene, and information regarding an angle supported by the corresponding scene.

The meta data further comprises information regarding a start location and a reproduction duration time of the corresponding scene. The search keyword includes at least one of a search keyword regarding scene type, a search keyword regarding character, a search keyword regarding actor, and a search keyword regarding search criterion which a producer arbitrarily defines.

The meta data is included in a PlayListMark, which is a group of marks, each mark indicating a specific location of moving picture data corresponding to a Playlist that is a reproduction unit of the moving picture data. Alternatively, such meta data can be recorded separately from a PlayListMark, which is a group of marks, each mark indicating a specific location of moving picture data corresponding to a Playlist that is a reproduction unit of the moving picture data.

According to another aspect of the present invention, a reproducing apparatus is provided with a search unit arranged to search for a scene satisfying a predetermined search condition, with reference to meta data, from a storage medium which stores moving picture data supporting multi-angle; and the meta data for providing an enhanced search function on the moving picture data, wherein the meta data is defined scene by scene, and comprises information regarding at least one search keyword to be applied to a corresponding scene and information regarding an angle supported by the corresponding scene; and a reproducing unit arranged to reproduce moving picture data corresponding to angle information supported by the searched scene.

The reproducing apparatus further includes a reader arranged to read the moving picture data and at least one of the meta data from the storage medium.

The search unit receives the at least one meta data from the reader, compares a predetermined search condition received from an external source with search keyword information included in the meta data, and searches for meta data satisfying the predetermined search condition.

The search keyword includes at least one of a search keyword regarding a scene type, a search keyword regarding one or more characters appearing in the corresponding scene, a search keyword regarding one or more actors/actresses playing the corresponding characters, and a search keyword regarding a search criterion which a producer arbitrarily defines.

The reproducing unit reproduces the moving picture data using information regarding a start location and a reproduction duration time of the searched scene.

The meta data defines a reproduction section decided by a part of PlayItems which are reproduction units of the moving picture data or at least one PlayItem, and when the reproduction section is defined by a single angle PlayItem and a multi-angle PlayItem, the reproducing unit reproduces moving picture data corresponding to a default angle with respect to the single angle PlayItem and reproduces moving picture data corresponding to a supported angle with respect to the multi-angle PlayItem.

According to another aspect of the present invention, a reproduction method is provided with receiving a predetermined search condition; searching for a scene satisfying the predetermined search condition, with reference to meta data, from a storage medium which stores moving picture data supporting multi-angle; and the meta data for providing an enhanced search function on the moving picture data, wherein the meta data is defined scene by scene, and comprises information regarding at least one search keyword to be applied to a corresponding scene and information regarding an angle supported by the corresponding scene; and reproducing moving picture data corresponding to angle information supported by the searched scene.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 5 shows an example in which the meta data shown in FIG. 4 is described by a markup language;

DETAILED DESCRIPTION OF THE EMBODIMENTS

Figure 1:
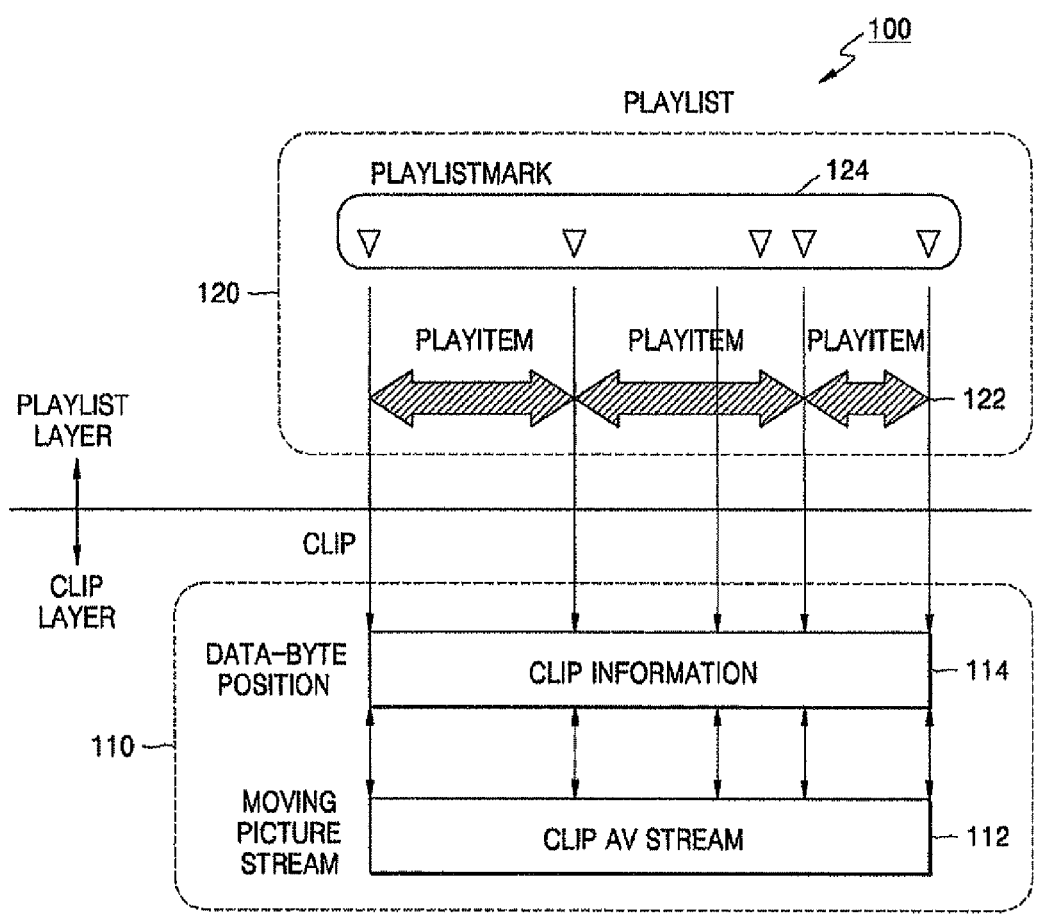
FIG. 1 is a view illustrating the structure of typical moving picture data recorded on a storage medium.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a view illustrating the structure of audio-visual (AV) data recorded on a storage medium. Referring to FIG. 1, a storage medium (such as the medium 910 shown, for example, in FIG. 9) is formed with multiple layers, i.e., at least a clip layer and a playlist layer, so as to manage the data structure 100 of AV data recorded thereon. The data structure 100 includes one or more clips 110 that are recording units of a moving picture (multimedia image), and one or more Playlists 120 that are reproducing units of a moving picture (multimedia image).

Each clip 110 is implemented as one object which includes a clip AV stream 112 for an AV data stream for a high quality picture movie, and clip information 114 for the attributes corresponding to the AV data stream. Each Playlist 120 is a set of reproduction intervals of these clips 110, and each reproduction interval is referred to as a PlayItem 122. Each Playlist 120 further includes a PlayListMark 124 to provide a specific location of AV data.

In the clip AV stream 112, AV data is recorded in units of clips. Generally, AV data is successively recorded in a storage area after being compressed and encoded to reduce a storage capacity. In order to reproduce the compressed and encoded AV data, characteristic information of the compressed AV data is needed. Accordingly, clip information 114 containing the characteristic information of the compressed AV data is included in each clip 110.

The clip information 114 includes characteristic information, such as the audio/video attribute of each AV data, an entry point map including the location information of entry points allowing random access in units of a predetermined region, etc. In the MPEG standard, which is widely used among moving picture compression methods, the entry point is the location information of an "I" picture from which intra pictures are compressed, and the entry point map is used for time search to detect a time point when a predetermined time elapses after reproduction is started.

Meanwhile, the storage medium 100 stores a plurality of Playlists 120, which are reproduction units. Each Playlist 120 includes a PlayListMark 124 indicating a specific location of AV data, and at least one PlayItem 122 which is a reproduction sub unit of the AV data.

The PlayItem 122 indicates a part of the AV stream, and more specifically, sets a reproduction start time and a reproduction end time of the AV stream and stores them in the clip information 114 to indicate a part of the corresponding AV data. That is, the PlayItem 122 is used to detect the location of a corresponding part in actual AV data using the entry point map included in the clip information 114.

Generally, AV data is reproduced in units of Playlists 120 and in an order of PlayItems 122 listed in a Playlist 120. However, it is possible to jump to a specific location of a moving image stream (AV data stream) using a PlayListMark 124 and reproduce the moving image stream (AV data stream) from the specific location.

Figure 2:
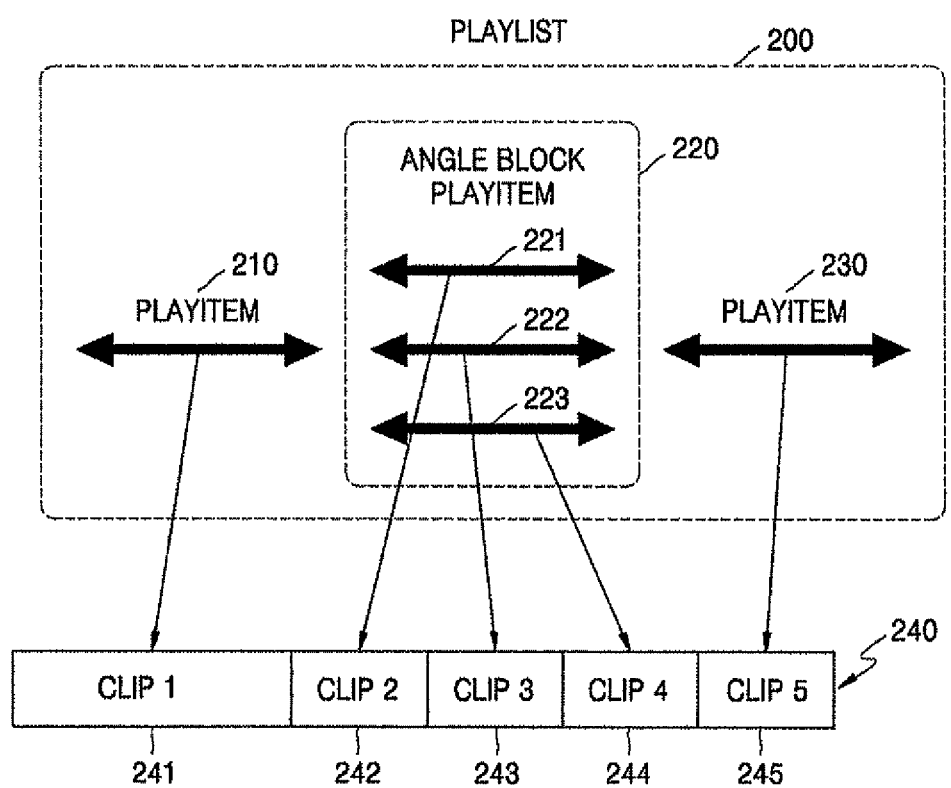
FIG. 2 is a view illustrating the structure of typical moving picture data including a multi-angle title recorded on a storage medium.

FIG. 2 is a view illustrating an example data structure of AV data including a multi-angle title. Referring to FIG. 2, a Playlist 200 includes a PlayItem 210, an angle block PlayItem 220, and a PlayItem 230.

The PlayItem 210 is a single-angle PlayItem and indicates a clip #1 241. The angle block PlayItem 220 includes information 221 indicating a clip #2 242, information 222 indicating a clip #3 243, and information 223 indicating clip #4 244. The PlayItem 230 indicates a clip #5 245.

Figure 3:
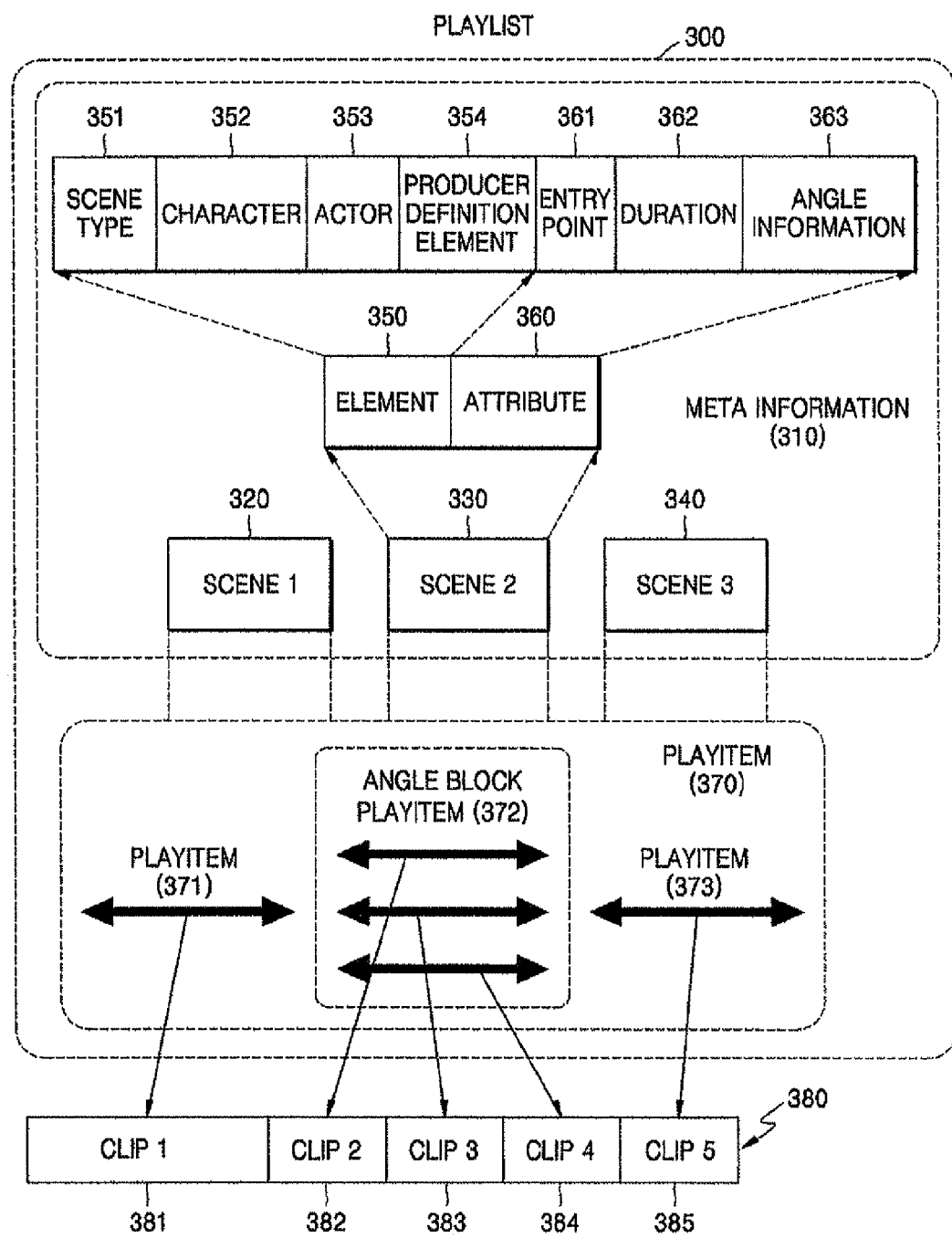
FIG. 3 is a view illustrating an example data structure of meta data providing an enhanced search function according to an embodiment of the present invention.

Turning now to FIG. 3, an example data structure of meta data providing an enhanced search function according to an embodiment of the present invention is illustrated. Referring to FIG. 3, a Playlist 300, which is a reproduction unit of a moving picture (multimedia image), includes PlayItems 370 and meta data 310, is defined according to a scene to include a reproduction section defined in one or some of the PlayItems 370. A content producer can arbitrarily classify scenes and allow the classified scenes to be independently reproduced.

The Playlist 300 includes meta data related to a scene #1 320, a scene #2 330, and a scene #3 340, wherein the scene #1 320 defines a part of the PlayItem 371, the scene #2 330 defines a part of the angle block PlayItem 372, and the scene #3 340 defines a part of the PlayItem 373.

The PlayItem 371 indicates a clip #1 381, the angle block PlayItem 372 indicates a clip #2 381, a clip #3 383, and a clip #4 384, and the PlayItem 373 indicates a clip #5 385.

Meta data corresponding to the scene #2 330 defining the angle block PlayItem 372 includes element information 350 and attribute information 360. The element information 350 includes information for extended search, such as SceneType 351 representing the types of scenes, Character 352 including information regarding characters appearing in the corresponding scene, Actor 353 including information regarding actors/actresses playing the corresponding characters, etc. In addition, the element information 350 can further include a producer definition element 354 representing information (such as background music, shooting location, property, etc.) which is arbitrarily defined by a content producer. Accordingly, it is possible to reproduce AV data while jumping to an arbitrary location of the AV data, according to a user's search criterion, such as scene, character, location, background music, property, etc., and to allow a user to perform various searches.

The attribute information 360 includes an entry point 361 representing a reproduction start point of the corresponding scene, a duration 362 representing a reproduction duration time of the corresponding scene, and angle information 363 representing information regarding respective angles included in the corresponding scene.

As such, in the information storage medium according to the present invention, meta data defined according to scene includes angle information. Therefore, if a producer inserts search keyword information of scenes corresponding to angles to be provided to users into the meta data, AV data corresponding to a desired angle can be provided when an enhanced search function according to scene is executed.

Figure 4:
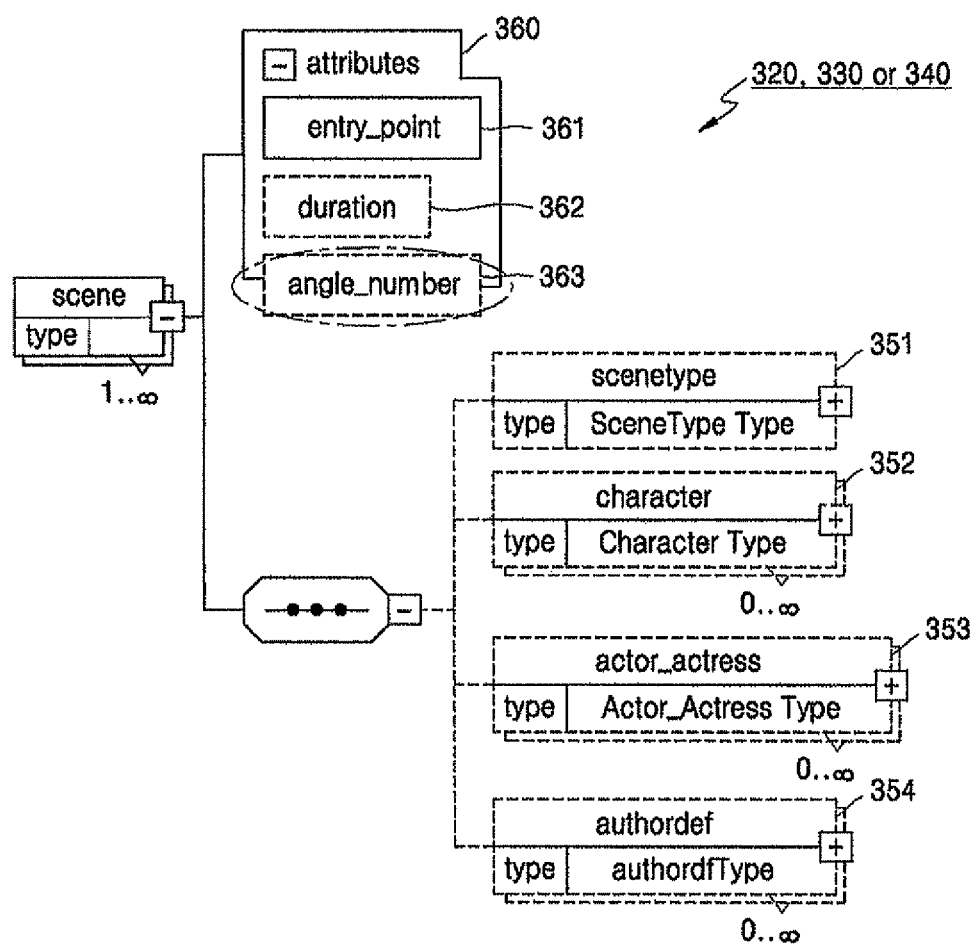
FIG. 4 is a view illustrating a meta data architecture which can be applied to a multi-angle title according to an embodiment of the present invention.

In more detail, a data structure of a scene, for example, scene #1 320, scene #2 330, and scene #3 340, as shown in FIG. 3, which is meta data 310 will be described. FIG. 4 is a view illustrating a meta data architecture which can be applied to a multi-angle title according to an embodiment of the present invention.

Specifically, FIG. 4 illustrates a data structure of a meta data scene, for example, scene #1 320, scene #2 330, and scene #3 340, as shown in FIG. 3, for providing an enhanced search function of searching for a desired location of AV data according to a user input and reproducing the AV data from the desired location. That is, the meta data scene, for example, scene #1 320, scene #2 330, and scene #3 340, as shown in FIG. 3, includes element information 350, such as scenetype information 351, character information 352, actor_actress information 353, and authordef information 354, which can be used as search keywords for various searches, and attribute information 360 such as entry-point information 361 representing a reproduction start point of the corresponding scene, duration information 362 representing a reproduction duration time of the corresponding scene, and angle_number information 363 representing a corresponding angle in the case of multi-angle are defined as attributes of the corresponding scene. Accordingly, by defining information regarding respective angles included in the corresponding scene using the angle_number information 363 being attribute information, it is possible to provide an enhanced search function according to angle in the case of a multi-angle title.

FIG. 5 shows an example in which the meta data illustrated in FIG. 4 is described by a markup language, such as an extensible markup language (XML).

Referring to FIG. 5, the meta data scene, for example, scene #1 320, scene #2 330, and scene #3 340, as shown in FIG. 3, is defined in an XML format. The meta data scene includes element information 350, such as "scenetype", "character", "actor_actress", and "authordef" as search keywords, thereby providing an enhanced search function using various search keywords. Also, the meta data scene includes attribute information 360, such as "entry_point", "duration", and "angle_number", thereby providing an enhanced search function in a multi-angle title.

Figure 6:
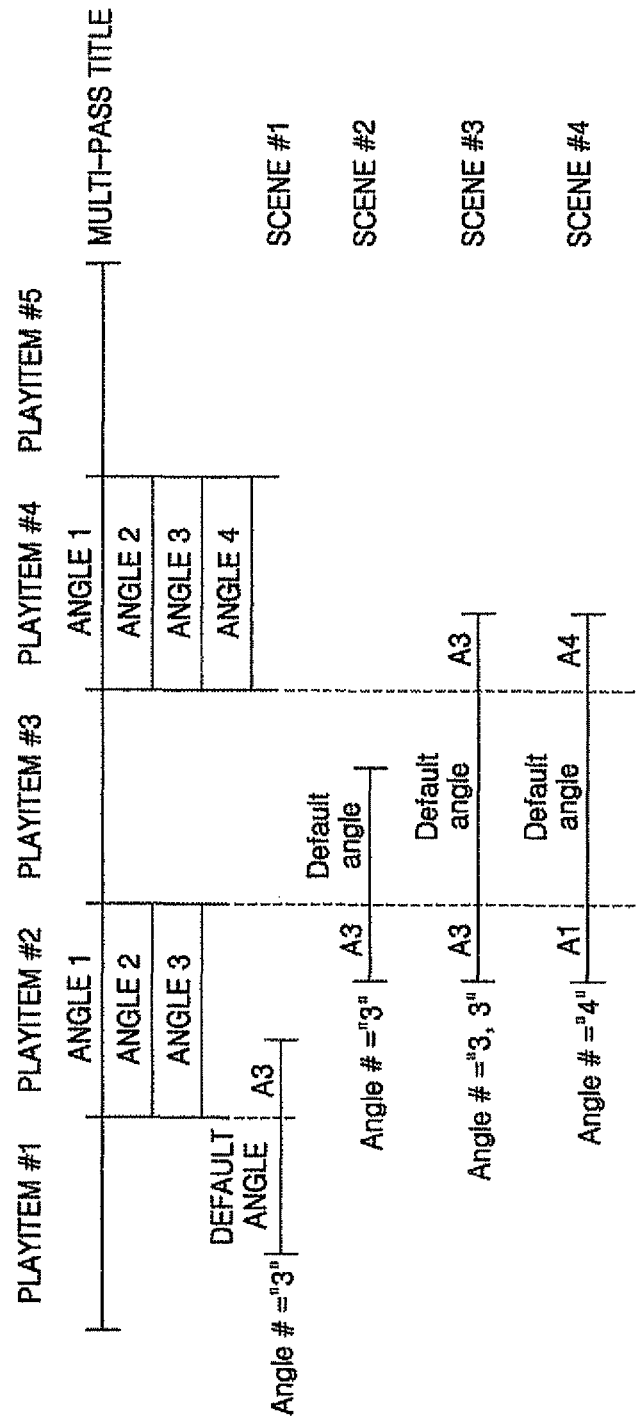
FIG. 6 is a view for explaining an example of providing an enhanced search function in a multi-angle title, using meta data according to an embodiment of the present invention.

FIG. 6 is a view for explaining an example of providing an enhanced search function in a multi-angle title using meta data according to an embodiment of the present invention.

Referring to FIG. 6, a multi-pass title consisting of a plurality of angles is shown. In FIG. 6, the multi-pass title consists of five (5) PlayItems, including PlayItems #1 through #5, wherein a PlayItem #2 consists of three (3) angles and a PlayItem #4 consists of four (4) angles. As shown in FIG. 6, each scene is defined by a single PlayItem, or by a plurality of PlayItems. Each meta data 310 regarding to each scene, for example, scene #1, scene #2, scene #3 and scene #4, includes information for extended searching on moving picture data of the corresponding scene.

Meanwhile, in the PlayItem #2 and the PlayItem #4 supporting multi-angle, information for extended searching on AV data corresponding to an angle of the plurality of angles is defined.

For example, in the case of scene #1, a reproduction section is defined by the PlayItems #1 and #2 and an angle number "3" is designated. Angle numbers are assigned only to PlayItems supporting multi-angle, and the remaining PlayItems not supporting multi-angle are reproduced as default angles. Accordingly, when the scene #1 is reproduced, the PlayItem #1 is reproduced as a default angle, and the PlayItem #2 supporting multi-angle is reproduced as an angle "3" according to a value defined in the corresponding angle_number attribute. Here, search keywords for extended search defined in the scene #1 are applied to the angle "3" in the PlayItem #2 supporting multi-angle.

In the case of scene #2, a reproduction section is defined by the PlayItems #2 and #3, and an angle number "3" is designated. Accordingly, when the scene #2 is reproduced, the PlayItem #2 is reproduced as an angle "3" according to a value defined in the corresponding angle number attribute, and the PlayItem #3 is reproduced as a default angle.

In the same manner, in the case of scene #3, a reproduction section is defined by the PlayItems #2, #3, and #4, and an angle number (3, 3) is designated. Accordingly, the PlayItem #2 supporting multi-angle is subjected to extended search by a search keyword based on the angle "3" according to the first designation value of angle numbers, the PlayItem #3 including single angle information is subjected to extended search by a search keyword based on a default angle, and the PlayItem #4 supporting multi-angle is subjected to extended search by a search keyword based on the angle "3" according to the second designation value of the angle numbers.

In the case of scene #4, a reproducing region is defined by the PlayItems #2, #3, and #4, and an angle number "4" is designated. Accordingly, the PlayItem #2 supporting multi-angle is subjected to extended search by a search keyword based on an angle "1" as a default angle because the PlayItem #2 does not include the corresponding angle "4", the PlayItem #3 including single angle information is subjected to extended search by a search keyword based on a default angle, and the PlayItem #4 supporting multi-angle is subjected to extended search by a search keyword based on the angle "4" according to the designated angle number "4".

As described above, by using meta data defined according to scene, it is possible to provide various extended search functions according to designated search keywords in the case of a multi-angle title.

Figure 7A:
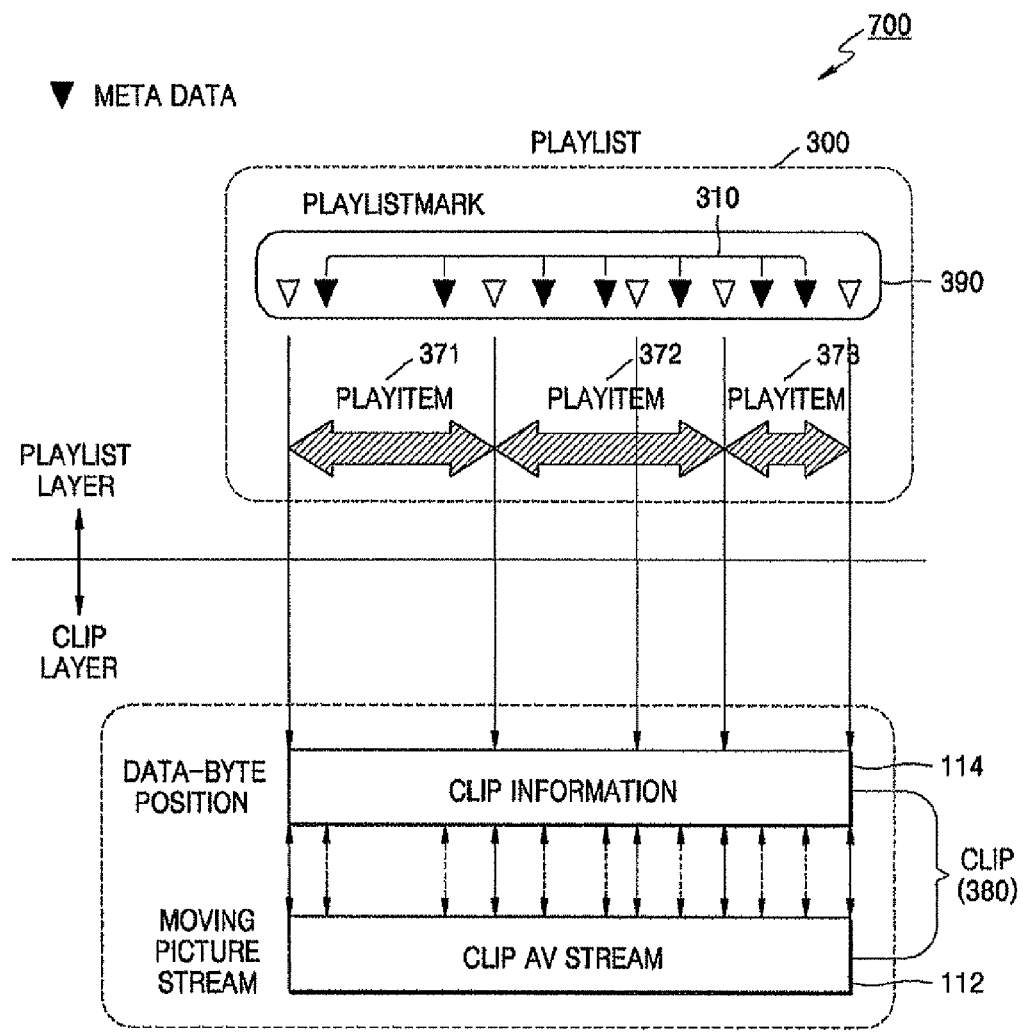
FIG. 7A shows an example format in which meta data is included in a PlayListMark according to an embodiment of the present invention.

FIG. 7A shows an example format in which meta data is included in a PlayListMark according to an embodiment of the present invention.

Referring to FIG. 7A, a storage medium 700 according to an embodiment of the present invention includes clips 380 including a clip AV stream 112 and clip information 114, and a Playlist 300 including PlayItems 371, 372, and 373. Each clip 380 is a recording unit of a moving picture (multimedia image), and the playlist 300 and the playitems 371, 372, and 373 are reproduction units of a moving picture (multimedia image). In addition, the storage medium 700 includes a PlayListMark 390 and meta data 310, as shown in FIG. 3, which is a search criterion according to aspects of the present invention. The PlayListMark 390 and the PlayItems 371, 372, and 373 have been described above with reference to FIG. 1, and thus, need not repeated herein.

In order to provide various search functions according to user's choices, the meta data 310, as shown in FIG. 3, includes search keyword information and location information of AV data according to a predetermined search criterion. The meta data 310 indicates an exact location of AV data with reference to the PlayItems 371, 372, and 373 and the clip information 114. Accordingly, various search functions are provided according to search information included in the meta data 310. According to an embodiment of the present invention, the meta data 310 is included in the PlayListMark 390.

Referring to FIG. 7A, the Playlist 300 includes the PlayListMark 390 and the PlayItems 371, 372, and 373. The meta data 310 for providing an enhanced search function is included in the PlayListMark 390.

The PlayItems 371, 372, and 373 include information for reproducing a part of AV data, as described above.

The PlayListMark 390 includes a mark used for chapter conversion, a mark indicating conversion timing of still images, and a mark indicating reproducing timing. Accordingly, a reproduction location of a designated timing can be searched for and identified. However, the PlayListMark 390 cannot provide searching and reproducing functions according to a user's search criterion, for example, according to scene, character, location, etc.

However, the meta data 310 provides an enhanced search function according to a user's search criterion, for example, according to scene, character, location, etc. In particular, according to the present invention, the meta data 310 provides specific angle information to PlayItems supporting multi-angle. The meta data 310, which provides the enhanced search function, includes search keyword information and location information. The search keyword information is used to search for a PlayListMark 390 including meta data 310 satisfying a user's search criterion. If a PlayListMark 390 including meta data 310 satisfying a user's search criterion is detected, a location of the corresponding AV data can be detected with reference to location information included in the PlayListMark 390 so that the AV data can be reproduced. If the meta data 310 according to the present invention contains specific angle information, a location of AV data corresponding to the angle information can be detected so that the AV data can be reproduced.

Figure 7B:
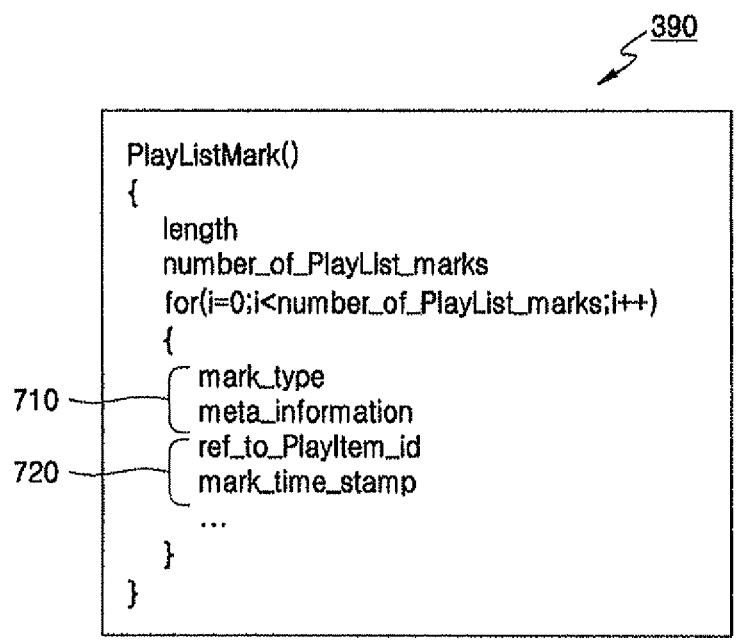
FIG. 7B shows an example syntax structure of a PlayListMark based on the format shown in FIG. 7A.

FIG. 7B shows a syntax structure of a PlayListMark based on the format shown in FIG. 7A. Referring to FIG. 7B, the PlayListMark 390 includes "number_of_Playlist_marks" information indicating the number of PlayListMarks defined in a Playlist 300, as shown in FIG. 7A, and "length" information indicating the data length of each PlayListMark 390.

Each PlayListMark 390 includes a search keyword "mark_type" to be compared with a predetermined search condition, and meta information "meta_information" representing a search keyword value related to the search keyword of meta data and/or additional information related to the search keyword, which are search keyword information 710 for providing an enhanced search function.

In addition, each PlayListMark 390 also includes a PlayItem identifier "ref_to_PlayItem_id" and time stamp data "mark_time_stamp", which are location information 720 for detecting a corresponding location from AV data, according to the searched result.

Accordingly, if a specific search condition is received from an external source (for example, if a user inputs a predetermined search condition), an reproducing apparatus according to the present invention searches for a mark corresponding to the received search condition with reference to meta data 310 included in a PlayListMark 390. If a mark satisfying the received search condition is found, the reproducing apparatus finds a corresponding location in a clip storing AV data, using a PlayItem identifier and time stamp data which are location information of the searched mark, and reproduces the AV data from the corresponding location.

Figure 8A:
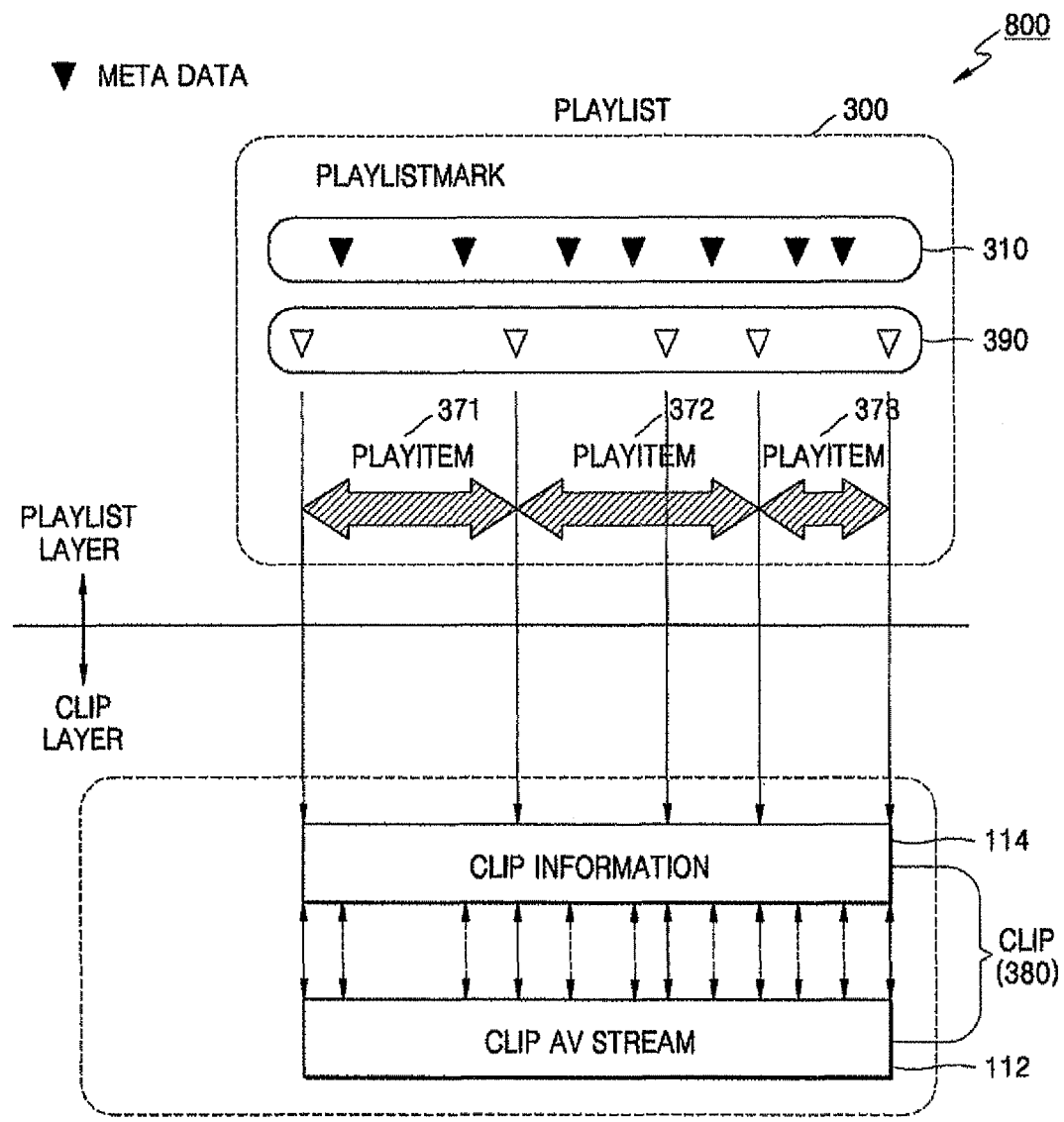
FIG. 8A shows an example format in which a PlayListMark is separated from meta data according to another embodiment of the present invention.

FIG. 8A shows an example format in which the PlayListMark 390 is separated from the meta data 310 according to another embodiment of the present invention.

Referring to FIG. 8A, a storage medium 800 according to an embodiment of the present invention includes also clips 380 including a clip AV stream 112 and clip information 114, and a Playlist 300 including PlayItems 371, 372, and 373 similar to the embodiment described with reference to FIG. 7A. However, the PlayListMark 390 and the meta data 310 are independently defined, differently from the embodiment shown in FIG. 7A. That is, the meta data 310 is recorded in the Playlist 300, independently from the PlayListMark 390. Each meta data item included in the meta data 310 indicates an exact location in AV data with reference to a PlayItem identifier and clip information 114 of PlayItems 371, 372, and 373, as described above.

Referring to FIG. 8A, the Playlist 300 includes the PlayListMark 390 and PlayItems 371, 372, and 373. Also, the meta data 310 for providing an enhanced search function is included in the Playlist 300, independently from the PlayListMark 390.

The PlayListMark 390 and the PlayItems 371, 372, and 373 have been described above with reference to FIG. 1, and thus, need not be repeated herein.

Figure 8B:
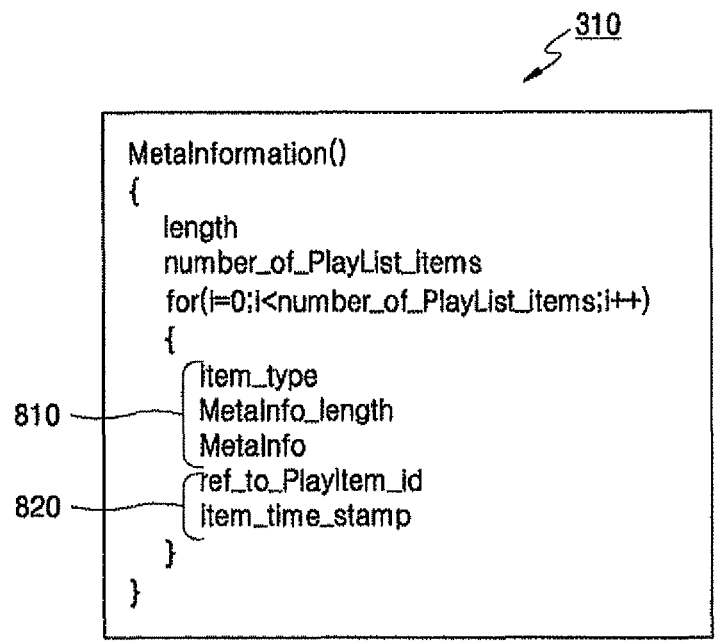
FIG. 8B shows example meta data based on the format shown in FIG. 8A.

FIG. 8B shows example meta data based on the format shown in FIG. 8A. Referring to FIG. 8B, "MetaInformation" is defined as an example data structure for implementing meta data 310. In the data structure "MetaInformation", a term "item" is used as a unit representing a search object constructing the meta data 310.

The data structure "MetaInformation" includes "number_of_Playlist_item" information representing the number of all meta data items defined in a Playlist, and "length" information representing the length of each meta data 310.

Each meta data item included in the meta data 310 includes a search keyword "item_type" to be compared with a predetermined search condition, meta data "MetaInfo" representing a search keyword value related to the search keyword of meta data and/or additional information related to the search keyword, and length information "MetaInfo_length" representing the length of the meta data, which are search keyword information 810 for providing an enhanced search function. In addition, each meta data item included in the meta data 310 also includes a PlayItem identifier "ref_to_PlayItem_id" and time stamp data "mark_time_stamp" which are location information for detecting a corresponding location from AV data, according to the searched result.

When a meta data item included in the meta data 310 satisfying a search condition received from a user is searched for, according to the format in which meta data 310 is included in PlayListMarks 390, as shown in FIGS. 7A-7B, all PlayListMark data is searched for. However, according to the format in which meta data 310 is recorded separately from PlayListMarks 390, as shown in FIGS. 8A-8B, only meta data 310 recorded independently is searched for, resulting in enhanced search efficiency.

Also, by defining a separate meta data structure, many limitations which may occur when a field for recording meta data is added to a conventional PlayListMark structure, can be removed.

As described above, a storage medium according to aspects of the present invention can include a plurality of meta data which provide a search criterion of AV data to search for the location of AV data satisfying a predetermined search condition and reproduce the AV data. Accordingly, it is possible to provide an enhanced search function according to various search criteria. Also, such a storage medium can be easily inserted into and removed from a reproducing apparatus, and is preferably an optical disc from which data can be read through an optical device of a reproducing apparatus. For example, the storage medium may be an optical disc, such as CD-ROM and DVD.

Hereinafter, an example reproducing apparatus for reproducing a storage medium including meta data having the data structure described with reference to FIG. 3, FIG. 4, FIG. 5, FIG. 6, FIGS. 7A-7B, and FIGS. 8A-8B will be described.

Figure 9:
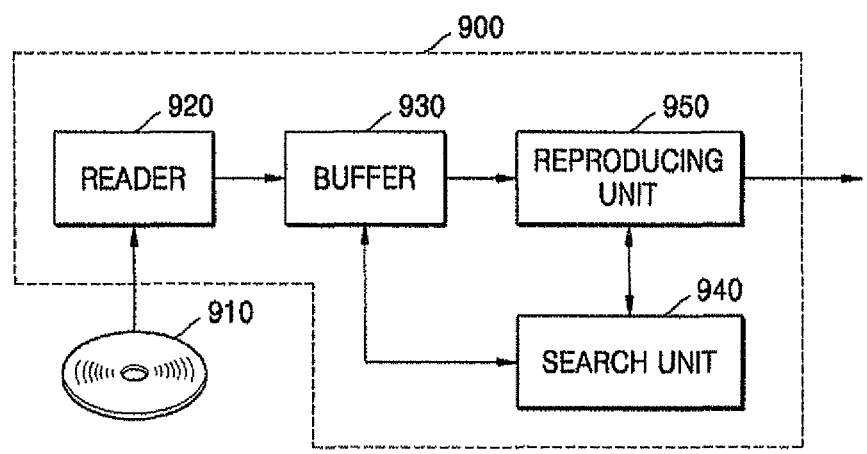
FIG. 9 is a block diagram of an example reproducing apparatus according to an embodiment of the present invention.

FIG. 9 is a schematic block diagram of a reproducing apparatus 900 according to an embodiment of the present invention. Referring to FIG. 9, the reproducing apparatus 900 includes a reader 920, a buffer unit 930, a search unit 940, and a reproducing unit 950.

The reader 920 reads AV data and at least one meta data 310, as shown, for example, in FIG. 3, FIGS. 7A-7B, and FIGS. 8A-8B, from a storage medium 910 according to the present invention.

The buffer unit 930 temporarily stores the AV data and the meta data 310 read from the reader 920 and transfers the stored data to the reproducing unit 950. However, such a buffer unit 930 may not be required, when the performance of the reader 920 is high enough not to require buffering.

The search unit 940 detects the location of AV data satisfying a predetermined search condition received from an external source with reference to the meta data 310, from the storage medium 910 including a plurality of meta data providing a search criterion of AV data.

That is, the search unit 940 receives the meta data 310 from the reader 920, compares a predetermined search condition received from an external source with search keyword information included in the received meta data 310, and transfers location information of AV data included in a meta data item included in the meta data 310 or a PlayListMark 390 satisfying the search condition to the reproducing unit 950. In particular, according to the present invention, the search unit 940 performs extended search on the AV data according to angle information included in the meta data 310, and transfers the searched location information related to the AV data to the reproducing unit 950.

The reproducing unit 950 reproduces AV data of a corresponding region on the basis of the searched location information of the AV data or the meta data item included in the meta data 310 received from the search unit 940.

Hereinafter, a method for reproducing the storage medium including the meta data according to the present invention will be described.

Figure 10:
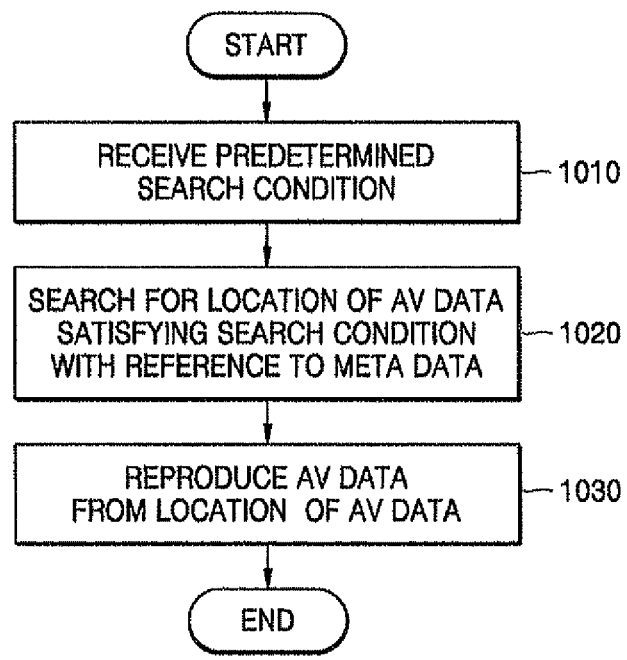
FIG. 10 is a flowchart of a reproducing method according to an embodiment of the present invention.

FIG. 10 is a flowchart of an example reproducing method according to an embodiment of the present invention. Referring to FIG. 10, a predetermined search condition is received to reproduce a storage medium (for example, storage medium 910, shown in FIG. 9) including meta data 310 providing an enhanced search function (operation 1010). Then, the location of AV data satisfying the search condition is searched according to angle information included in the meta data 310, from the storage medium 910 including at least one meta data 310 used for searching for AV data and a location of AV data satisfying a predetermined search condition (operation 1020). Then, the AV data is reproduced from a location of AV data satisfying the search condition (operation 1030).

Meanwhile, example embodiments of an extended search method according to the present invention can be written as a computer program and can be implemented in a general digital computer that executes the computer program using a computer readable medium. Codes and code segments constructing the computer program can be easily induced by computer programmers in the art. Also, the program is stored in a computer-readable media and read and executed by computers, thereby implementing the extended search method. Examples of the computer readable medium include magnetic storage media (e.g., ROM, floppy disks, hard disks, etc.), optical recording media (e.g., CD-ROMs, DVDs, etc.), and storage media such as carrier waves (e.g., transmission through the Internet). The computer readable medium can also be distributed over network coupled computer systems so that the computer readable code is stored and executed in a distributed fashion.

As described above, according to the present invention, there are provided a storage medium including meta data providing various enhanced search functions related to moving picture data supporting multi-angle, and a reproducing apparatus and method for reproducing the storage medium. That is, by defining meta data scenes and defining various search keywords, an entry point, and duration for each scene, to perform extended search on moving picture data supporting multi-angle, an enhanced search function using various search keywords can be provided. Furthermore, by defining angle numbers for distinguishing a plurality of angles according to scene, it is possible to provide a search keyword according to an angle and provide an enhanced search function in a multi-pass title composed of a plurality of angles.

While the present invention has been particularly shown and described with reference to exemplary embodiments thereof, it will be understood by those of ordinary skill in the art that various changes in form and details may be made therein without departing from the spirit and scope of the present invention. For example, any computer readable media or data storage devices may be utilized, as long as meta data is included in the PlayList in the manner shown in FIG. 3, FIGS. 7A-7B, and 8A-8B. In addition, meta data can also be configured differently as shown in FIG. 3 or FIG. 4. Moreover, a reproducing apparatus as shown in FIG. 9 can be implemented as part of a recording apparatus, or alternatively a single apparatus for performing recording and/or reproducing functions with respect to a storage medium. Similarly, the CPU can be implemented as a chipset having firmware, or alternatively, a general or special purposed computer programmed to perform the methods as described, for example, with reference to FIG. 10. Accordingly, it is intended, therefore, that the present invention not be limited to the various example embodiments disclosed, but that the present invention includes all embodiments falling within the scope of the appended claims.

What is claimed is:

1. A non-transitory computer readable information storage medium comprising:
   moving picture data for supporting multi-angle; and
   meta data which is used in title scene search,
   wherein the meta data is defined scene by scene, and comprises information regarding at least one search keyword to be applied to a corresponding scene, and attributes comprising entry point which specifies a start point of the corresponding scene, duration which specifies a duration of the corresponding scene and angle number which specifies an angle of a multi-angle supporting scene,
   wherein, when the multi-angle supporting scene is searched and defined by a first Playitem that supports multi-angle and a second Playitem that does not support multi-angle, an angle corresponding to the searched multi-angle supporting scene from among angles supported by the first Playitem is reproduced in the first Playitem and a default angle is reproduced in the second Playitem.

2. A reproducing apparatus comprising:
   a reading unit arranged to read moving picture data and meta data which is used in title scene search, from a storage medium provided with moving picture data supporting multi-angle, wherein the meta data is defined scene by scene, and comprises information regarding at least one search keyword to be applied to a corresponding scene and attributes comprising entry point which specifies a start point of the corresponding scene, duration which specifies a duration of the corresponding scene and angle number which specifies an angle of a multi-angle supporting scene; and
   a reproducing unit arranged to reproduce moving picture data corresponding to the angle number,
   wherein, when the multi-angle supporting scene is searched and the multi-angle supporting scene is defined by a first Playitem that supports multi-angle and a second Playitem that does not support multi-angle, the reproducing unit reproduces an angle corresponding to the searched multi-angle supporting scene from among angles supported by the first Playitem in the first Playitem and reproduces a default angle in the second Playitem.

3. A reproducing method comprising:
   reading moving picture data and meta data which is used in title scene search, from a storage medium provided with moving picture data supporting multi-angle, wherein the meta data is defined scene by scene, and comprises information regarding at least one search keyword to be applied to a corresponding scene and attributes comprising entry point which specifies a start point of the corresponding scene, duration which specifies a duration of the corresponding scene and angle number which specifies an angle of a multi-angle supporting scene; and
   reproducing moving picture data corresponding to the angle number,
   wherein when the multi-angle supporting scene is searched and the multi-angle supporting scene is defined by a first Playitem that supports multi-angle and a second Playitem that does not support multi-angle, the reproducing comprises reproducing an angle corresponding to the searched multi-angle supporting scene from among angles supported by the first Playitem in the first Playitem and reproducing a default angle in the second Playitem.

* * * * *